US008010598B2

(12) United States Patent
Tanimoto

(10) Patent No.: US 8,010,598 B2
(45) Date of Patent: *Aug. 30, 2011

(54) RELAY SERVER AND CLIENT TERMINAL

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 679 days.

This patent is subject to a terminal disclaimer.

(21) Appl. No.: 11/953,351

(22) Filed: Dec. 10, 2007

(65) Prior Publication Data

US 2008/0147825 A1    Jun. 19, 2008

(30) Foreign Application Priority Data

Dec. 19, 2006    (JP) ................................. 2006-341066

(51) Int. Cl.
*G06F 15/16* (2006.01)
*G06F 15/173* (2006.01)
(52) U.S. Cl. ........ 709/203; 709/206; 709/217; 709/225; 709/229; 709/230; 709/238; 709/246
(58) Field of Classification Search .................. 709/203, 709/206, 217, 225, 229, 230, 238, 246; 370/352, 370/389, 401
See application file for complete search history.

(56) References Cited

U.S. PATENT DOCUMENTS

| | | | |
|---|---|---|---|
| 5,224,205 | A | 6/1993 | Dinkin et al. |
| 5,535,375 | A | 7/1996 | Eshel et al. |
| 5,848,134 | A | 12/1998 | Sekiguchi et al. |
| 5,884,312 | A | 3/1999 | Dustan et al. |
| 6,061,796 | A | 5/2000 | Chen et al. |

(Continued)

FOREIGN PATENT DOCUMENTS

EP    1 054 547 A2    11/2000

(Continued)

OTHER PUBLICATIONS

Tanimoto: "Relay Server and Relay Communication System," U.S. Appl. No. 12/335,642, filed Dec. 16, 2008.

(Continued)

*Primary Examiner* — Emmanuel L Moise
*Assistant Examiner* — Vitali Korobov
(74) *Attorney, Agent, or Firm* — Keating & Bennett, LLP

(57) ABSTRACT

A relay server is connected to a LAN and communicable with a relay server of another LAN. The relay server includes an account information registering unit arranged to store account information including information of a client terminal connected to the same LAN; a relay group information registering unit arranged to store relay group information including information of a group of relay servers permitting connection with one another; a shared resource information registering unit arranged to store shared resource information including information of a resource and information of the client terminals sharing the resource; a relay processing unit arranged to, when accepting from the client terminal stored in the account information registering unit operation instruction on a resource operable by a client terminal connected to another LAN based on the shared resource information, relay the operation of the resource based on the relay group information; and a resource information providing unit arranged to, when accepting an access based on a predetermined protocol from an external client terminal, convert the shared resource information to a format of the predetermined protocol and providing the information to the external client terminal, the external client terminal other than the client terminal stored in the account information registering unit being registerable in the shared resource information registering unit.

10 Claims, 14 Drawing Sheets

U.S. PATENT DOCUMENTS

| | | | |
|---|---|---|---|
| 6,111,883 A | 8/2000 | Terada et al. | |
| 6,145,084 A | 11/2000 | Zuili et al. | |
| 6,215,877 B1 | 4/2001 | Matsumoto | |
| 6,222,536 B1 | 4/2001 | Kihl et al. | |
| 6,226,692 B1 | 5/2001 | Miloushev et al. | |
| 6,237,023 B1 | 5/2001 | Yoshimoto | |
| 6,336,141 B1 | 1/2002 | Fujiyama et al. | |
| 6,538,773 B1 | 3/2003 | Brossman et al. | |
| 6,546,488 B2 | 4/2003 | Dillon et al. | |
| 6,564,261 B1 | 5/2003 | Gudjonsson et al. | |
| 6,594,246 B1 | 7/2003 | Jorgensen | |
| 6,636,513 B1 | 10/2003 | Nishikawa et al. | |
| 6,650,631 B1* | 11/2003 | Benash et al. | 370/352 |
| 6,754,212 B1 | 6/2004 | Terada et al. | |
| 6,757,365 B1 | 6/2004 | Bogard | |
| 6,766,373 B1 | 7/2004 | Beadle et al. | |
| 6,889,256 B1 | 5/2005 | Palevich et al. | |
| 6,898,641 B1 | 5/2005 | Kobayashi | |
| 6,950,879 B2 | 9/2005 | Zhou | |
| 6,988,199 B2 | 1/2006 | Toh et al. | |
| 7,000,248 B2 | 2/2006 | Mizukoshi | |
| 7,120,927 B1 | 10/2006 | Beyda et al. | |
| 7,139,811 B2 | 11/2006 | Lev Ran et al. | |
| 7,174,378 B2 | 2/2007 | Yoon et al. | |
| 7,191,195 B2 | 3/2007 | Koyama et al. | |
| 7,206,088 B2 | 4/2007 | Tanimoto | |
| 7,299,275 B2 | 11/2007 | Tsukidate et al. | |
| 7,412,489 B2* | 8/2008 | Nowacki et al. | 709/206 |
| 7,574,523 B2* | 8/2009 | Traversat et al. | 709/238 |
| 7,701,954 B2* | 4/2010 | Rabenko et al. | 370/401 |
| 7,774,495 B2* | 8/2010 | Pabla et al. | 709/238 |
| 2001/0044819 A1 | 11/2001 | Gong | |
| 2001/0047414 A1 | 11/2001 | Yoon et al. | |
| 2002/0023143 A1 | 2/2002 | Stephenson et al. | |
| 2002/0032616 A1 | 3/2002 | Suzuki et al. | |
| 2002/0073182 A1 | 6/2002 | Zakurdaev et al. | |
| 2002/0095506 A1 | 7/2002 | Tanimoto | |
| 2002/0118398 A1 | 8/2002 | Tanimoto | |
| 2002/0143855 A1* | 10/2002 | Traversat et al. | 709/202 |
| 2002/0143956 A1 | 10/2002 | Tanimoto | |
| 2002/0143960 A1 | 10/2002 | Goren et al. | |
| 2002/0146002 A1 | 10/2002 | Sato | |
| 2002/0152299 A1* | 10/2002 | Traversat et al. | 709/223 |
| 2004/0083385 A1 | 4/2004 | Ahmed et al. | |
| 2004/0148432 A1 | 7/2004 | Udono et al. | |
| 2004/0255048 A1 | 12/2004 | Lev Ran et al. | |
| 2005/0076098 A1 | 4/2005 | Matsubara et al. | |
| 2006/0083171 A1 | 4/2006 | Tanaike et al. | |
| 2006/0256771 A1 | 11/2006 | Yarlagadda | |
| 2006/0282540 A1 | 12/2006 | Tanimoto | |
| 2007/0022477 A1 | 1/2007 | Larson | |
| 2007/0233844 A1 | 10/2007 | Tanimoto | |
| 2008/0089349 A1 | 4/2008 | Tanimoto | |
| 2008/0098088 A1 | 4/2008 | Tamano et al. | |
| 2008/0288591 A1 | 11/2008 | Tanimoto | |

FOREIGN PATENT DOCUMENTS

| | | |
|---|---|---|
| GB | 2 350 269 A | 11/2000 |
| JP | 56-025880 B2 | 3/1981 |
| JP | 61-225957 A | 10/1986 |
| JP | 04-105143 A | 4/1992 |
| JP | 07-162448 A | 6/1995 |
| JP | 07-319784 A | 12/1995 |
| JP | 09-288608 A | 11/1997 |
| JP | 10-177548 A | 6/1998 |
| JP | 11-234270 A | 8/1999 |
| JP | 11-272534 A | 10/1999 |
| JP | 11-313059 A | 11/1999 |
| JP | 2000-115167 A | 4/2000 |
| JP | 2001-014254 A | 1/2001 |
| JP | 2001-184289 A | 7/2001 |
| JP | 2001-292167 A | 10/2001 |
| JP | 2002-007182 A | 1/2002 |
| JP | 2002-199150 A | 7/2002 |
| JP | 2002-217943 A | 8/2002 |
| JP | 2002-269059 A | 9/2002 |
| JP | 2002-288415 A | 10/2002 |
| JP | 2002-314573 A | 10/2002 |
| JP | 2003-6032 A | 1/2003 |
| JP | 2003-032310 A | 1/2003 |
| JP | 2003-162441 A | 6/2003 |
| JP | 2004-013479 A | 1/2004 |
| JP | 2004-201255 A | 7/2004 |
| JP | 2004-310371 A | 11/2004 |
| JP | 2005-027040 A | 1/2005 |
| JP | 2005-115943 A | 4/2005 |
| JP | 2006-13757 A | 1/2006 |
| JP | 2006-033105 A | 2/2006 |
| JP | 2006-268138 A | 10/2006 |
| JP | 2006-343943 A | 12/2006 |
| JP | 2007-265135 A | 10/2007 |
| JP | 2007-267136 A | 10/2007 |
| JP | 2008-098699 A | 4/2008 |
| JP | 2008-098888 A | 4/2008 |
| JP | 2008-148125 A | 6/2008 |
| JP | 2008-154101 A | 7/2008 |
| JP | 2008-306500 A | 12/2008 |
| JP | 2009-027652 A | 2/2009 |
| JP | 2009-163300 A | 7/2009 |
| JP | 2009-163302 A | 7/2009 |
| JP | 2009-252159 A | 10/2009 |
| JP | 2009-265919 A | 11/2009 |

OTHER PUBLICATIONS

Tanimoto: "Relay Server and Relay Communication System," U.S. Appl. No. 12/335,661, filed Dec. 16, 2008.

Tanimoto: "Relay Server and Relay Communication System," U.S. Appl. No. 12/340,868, filed Dec. 22, 2008.

Shinji Okumura et al., SIP (session initiation protocol), Nikkei Communications, Sep. 22, 2003, pp. 150-158 (partial translation pp. 155-156 (Usable in IM and Presence Notification)).

Tanimoto, " Relay Server and Relay Communication System," U.S. Appl. No. 12/270,883, filed Nov. 14, 2008.

Tanimoto: "Relay-Server," U.S. Appl. No. 11/853,943, filed Sep. 12, 2007.

Tanimoto: "File Server Device," U.S. Appl. No. 11/862,654, filed Sep. 27, 2007.

Tanimoto: "File Transfer Server," U.S. Appl. No. 11/870,622, filed Oct. 11, 2007.

Tanimoto: "Relay Server, Relay Communication System, and Communication Device," U.S. Appl. No. 11/944,495, filed Nov. 23, 2007.

Tanimoto: "Relay Server and Relay Communication System," U.S. Appl. No. 11/953,505, filed Dec. 10, 2007.

Tanimoto: "Relay Server and Relay Communication System," U.S. Appl. No. 12/103,933, filed Apr. 16, 2008.

Tanimoto: "Relay Server and Relay Communication System," U.S. Appl. No. 12/112,127, filed Apr. 30, 2008.

Tanimoto: "Relay Server and Relay Communication System," U.S. Appl. No. 12/107,793, filed Apr. 23, 2008.

Official communication issued in counterpart Japanese application No. 2006-341066, mailed on Oct. 28, 2008.

Tanimoto; "Relay Server, Communication System and Facsimile System"; U.S. Appl. No. 10/045,698, filed Jan. 10, 2002.

Tanimoto; "Relay Server, Communication System and Facsimile System"; U.S. Appl. No. 10/045,897, filed Jan. 10, 2002.

Tanimoto; "Relay Server for Relaying Communications Between Network Devices"; U.S. Appl. No. 10/114,720, filed Apr. 1, 2002.

Tanimoto; "Relay Server"; U.S. Appl. No. 10/114,963, filed Apr. 2, 2002.

Tanimoto; "Relay Server, Network Device, Communication System, and Communication Method"; U.S. Appl. No. 10/116,615, filed Apr. 2, 2002.

Masuda et al.; "Multicast Network Control for Streaming Data Broadcasting"; IEICE Technical Report, vol. 100, No. 672; pp. 327-334; Mar. 9, 2001.

"An Old-Timer of Character Chat IRC"; Mac Fan Internet; vol. 4, No. 6; p. 33; Jun. 1999.

Official Communication issued in U.S. Appl. No. 11/723,466, mailed on Nov. 8, 2010.

Tanimoto; "Relay Device and Communication System"; U.S. Appl. No. 11/723,466, filed Mar. 20, 2007.

English translation of Official Communication issued in corresponding Japanese Patent Application No. 2006-334652, mailed on Jun. 8, 2010.

English translation of Official Communication issued in corresponding Japanese Patent Application No. 2007-152122, mailed on Jun. 2, 2010.

Tanimoto, "Relay Server and Relay Communication System", U.S. Appl. No. 13/061,234, filed Feb. 28, 2011.

Tanimoto, "Relay Server, Relay Communication System, and Communication Apparatus", U.S. Appl. No. 13/061,725, filed Mar. 2, 2011.

Official Communication issued in International Patent Application No. PCT/JP2010/001594, mailed on Mar. 30, 2010.

Official Communication issued in International Patent Application No. PCT/JP2010/003240, mailed on Jun. 15, 2010.

Official Communication issued in International Patent Application No. PCT/JP2010/005041, mailed on Nov. 22, 2010.

Official Communication issued in International Patent Application No. PCT/JP2010/005679, mailed on Oct. 26, 2010.

Official Communication issued in International Patent Application No. PCT/JP2010/005680, mailed on Oct. 26, 2010.

Hitoshi, "Network World", vol. 9, No. 12, Dec. 1, 2004, pp. 148-150.

Official Communication issued in corresponding Japanese Patent Application No. 2007-339311, mailed on Apr. 8, 2011.

"Error & Warning Message Ways of Coping, Nikkei Personal Computer", Nikkei Business Publications, Inc., May 10, 2007.

Official Communication issued in corresponding European Patent Application No. 08007866.0, mailed on Apr. 19, 2011.

* cited by examiner

FIG. 5

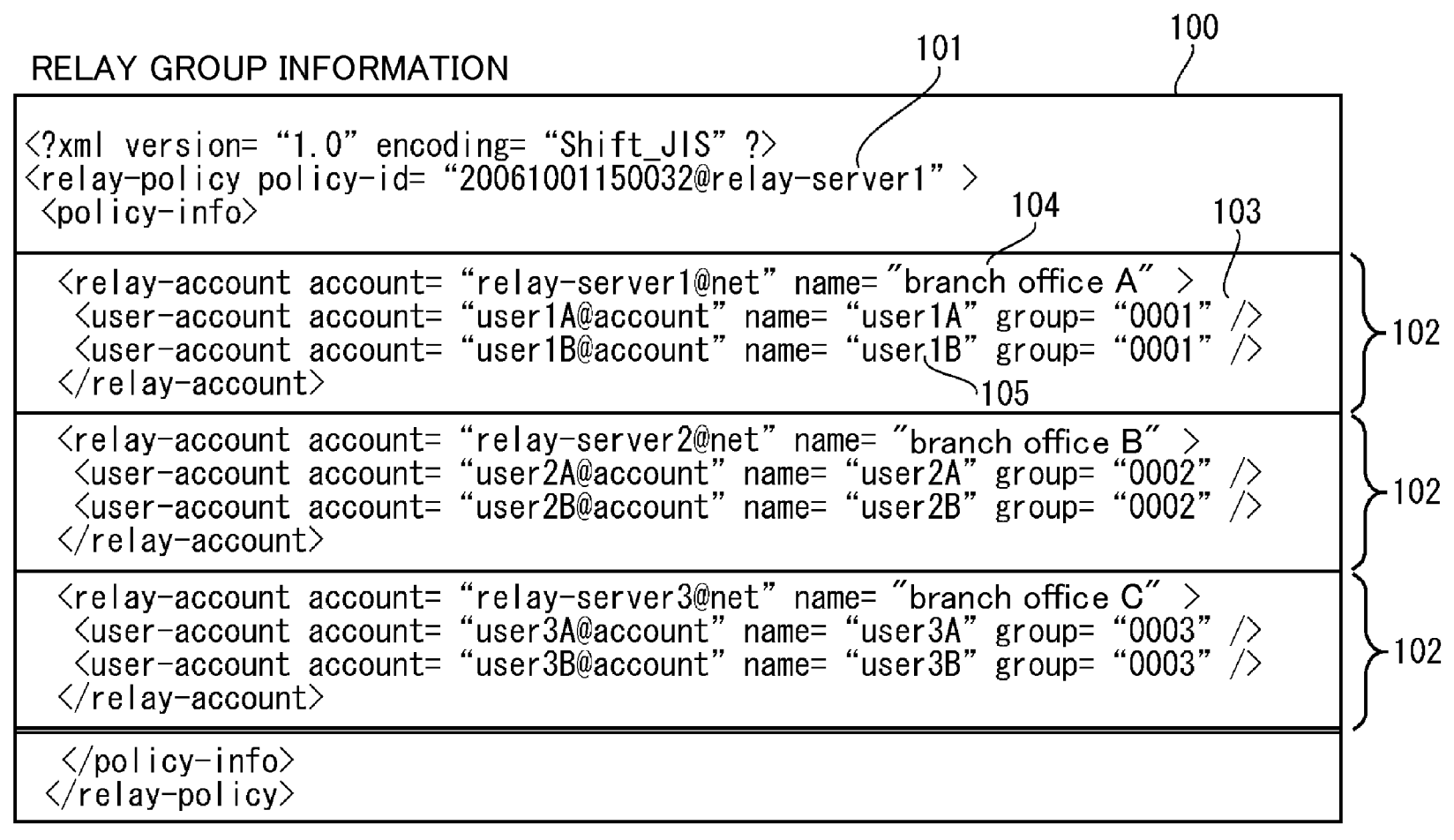

RELAY GROUP INFORMATION

```
<?xml version="1.0" encoding="Shift_JIS" ?>
<relay-policy policy-id="20061001150032@relay-server1" >
<policy-info>

<relay-account account="relay-server1@net" name="branch office A" >
  <user-account account="user1A@account" name="user1A" group="0001" />
  <user-account account="user1B@account" name="user1B" group="0001" />
</relay-account>

<relay-account account="relay-server2@net" name="branch office B" >
  <user-account account="user2A@account" name="user2A" group="0002" />
  <user-account account="user2B@account" name="user2B" group="0002" />
</relay-account>

<relay-account account="relay-server3@net" name="branch office C" >
  <user-account account="user3A@account" name="user3A" group="0003" />
  <user-account account="user3B@account" name="user3B" group="0003" />
</relay-account>

</policy-info>
</relay-policy>
```

FIG. 6

SHARED RESOURCE INFORMATION

```xml
<?xml version="1.0" encoding="Shift_JIS" ?>
<user-account account="user1A@account" >
    <policy name="user1A-policy01" policy-id="20061001150032user1A@relay-server1" >
        <family-account-info>
            <user-account account="user1A@account" />
            <user-account account="user2A@account" />
            <user-account account="user3A@account" />
        </family-account-info>
        <family-resource-info>
            <resource name="folderA" owner="user1A@account" value="c:/folderA" >
                <resource name="file001.xls" owner="user1A@account" value="c:/folderA/file001.xls" />
                <resource name="file002.wrd" owner="user1A@account" value="c:/folderA/file002.wrd" />
                <resource name="file003.doc" owner="user1A@account" value="c:/folderA/file003.doc" />
            </resource>
        </family-resource-info>
    </policy>
</user-account>
```

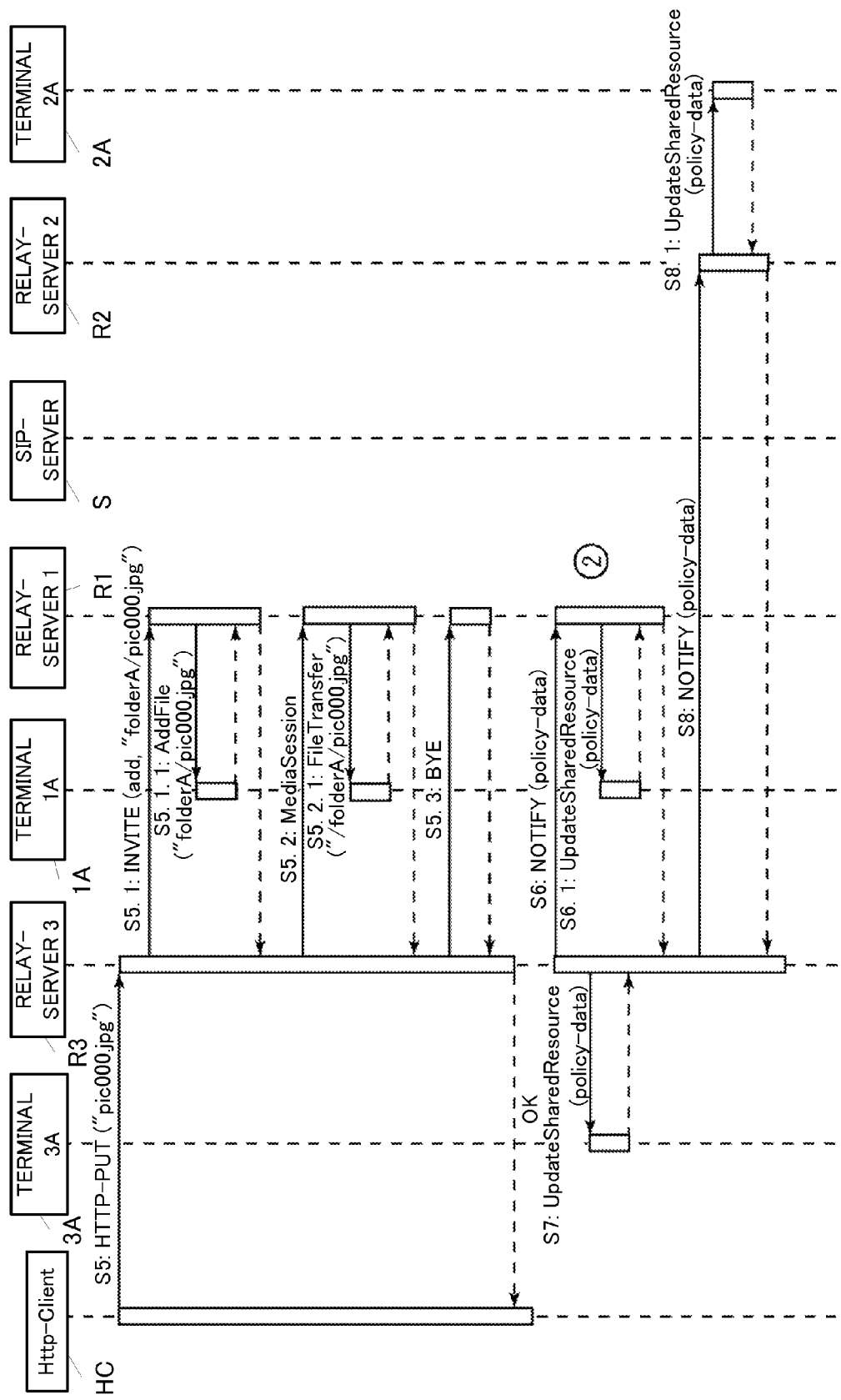

FIG. 9

SHARED RESOURCE INFORMATION UPDATED IN (1)

```xml
<?xml version="1.0" encoding="Shift_JIS" ?>
<user-account account="user1A@account" >
<policy name="user1A-policy01" policy-id="20061001150032user1A@relay-server1" >
  <family-account-info>
    <user-account account="user1A@account" />
    <user-account account="user2A@account" />
    <user-account account="user3A@account" />
    <http-account account="http-account1" />
  </family-account-info>
  <family-resource-info>
    <resource name="folderA" owner="user1A@account" value="c:/folderA" http="enable" http-act="rw" >
      <resource name="file001.xls" owner="user1A@account" value="c:/folderA/file001.xls" http="enable" http-act="r/d" />
      <resource name="file002.wrd" owner="user1A@account" value="c:/folderA/file002.wrd" http="disable" />
      <resource name="file003.doc" owner="user1A@account" value="c:/folderA/file003.doc" http="enable" http-act="r" />
    </resource>
  </family-resource-info>
</policy>
</user-account>
```

FIG. 10

HTML OUTPUT FROM SHARED RESOURCE INFORMATION UPDATED IN (1)

```
<!DOCTYPE HTML PUBLIC "-//W3C//DTD HTML 4.01 Transitional//EN" >
<html><head><meta http-equiv="Content-Type" content="text/html;charset=iso-8859-1" >
<title>user1A-policy01</title>
</head><body>
user1A-policy01
<p>
<form enctype="application/x-www-form-urlencoded" action="server_cgi" method=POST>
<ul>
<li><a href="#folder_a" >folderA</a><span>......</span><INPUT type=submit name="upload" value=
"FILE UPLOAD" ></li>

<ul><li><a href="#file001.xls" >file001.xls</a><span>......</span><INPUT type=submit name=
"d#file001.xls" value="DELETE" ></li></ul>

<ul><li><a href="#file003.doc" >file003.doc</a></li>
</ul>
</form>
</body>
</html>
```

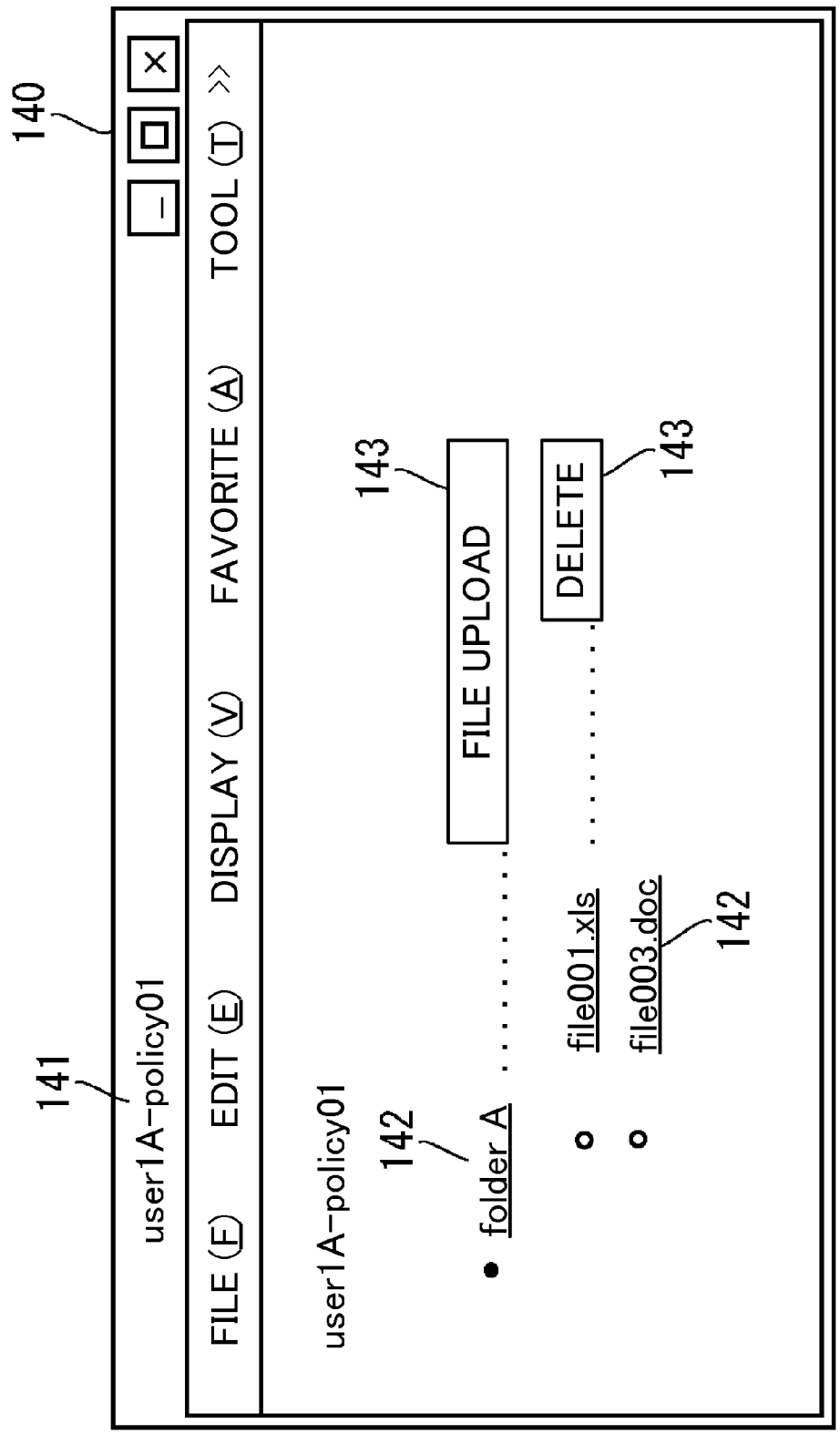

FIG. 12

SHARED RESOURCE INFORMATION UPDATED IN (2)

```xml
<?xml version="1.0" encoding="Shift_JIS" ?>
<user-account account="user1A@account" >
<policy name="user1A-policy01" policy-id="20061001150032user1A@relay-server1" >
  <family-account-info>
    <user-account account="user1A@account" />
    <user-account account="user2A@account" />
    <user-account account="user3A@account" />
    <http-account account="http-account1" />
  </family-account-info>
  <family-resource-info>
    <resource name="folderA" owner="user1A@account" value="c:/folderA" http="enable" http-act="rw" >
      <resource name="file001.xls" owner="user1A@account" value="c:/folderA/file001.xls" http="enable" http-act="r/d" />
      <resource name="file002.wrd" owner="user1A@account" value="c:/folderA/file002.wrd" http="disable" />
      <resource name="file003.doc" owner="user1A@account" value="c:/folderA/file003.doc" http="enable" http-act="r" />
      <resource name="pic000.jpg" owner="user1A@account" value="c:/folderA/pic000.jpg" http="enable" http-act="r/d" />
    </resource>
  </family-resource-info>
</policy>
</user-account>
```

FIG. 13

HTML OUTPUT FROM SHARED RESOURCE INFORMATION UPDATED IN (2)

```
<!DOCTYPE HTML PUBLIC "-//W3C//DTD HTML 4.01 Transitional//EN" >
<html><head><meta http-equiv="Content-Type" content="text/html;charset=iso-8859-1" >
<title>user1A-policy01</title>
</head><body>
<p>
user1A-policy01
</p>
<form enctype="application/x-www-form-urlencoded" action="server_cgi" method=POST>
<ul>
<li><a href="#folder_a" >folderA</a><span>......</span><INPUT type=submit name="upload" value=
"FILE UPLOAD" ></li>

<ul><li><a href="#file001.xls" >file001.xls</a><span>......</span><INPUT type=submit name=
"d#file001.xls" value="DELETE" ></li></ul>

<ul><li><a href="#file003.doc" >file003.doc</a></span></ul>

<ul><li><a href="#pic000.jpg" >pic000.jpg</a></span>......</span><INPUT type=submit name=
"d#pic000.jpg" value="DELETE" ></li></ul>
</ul>
</form>
</body>
</html>
```

131 (near user1A-policy01)
132 (folder_a / folderA)
132a (file001.xls entries)
133 (upload INPUT)
133a (delete INPUT)
130 (outer frame)

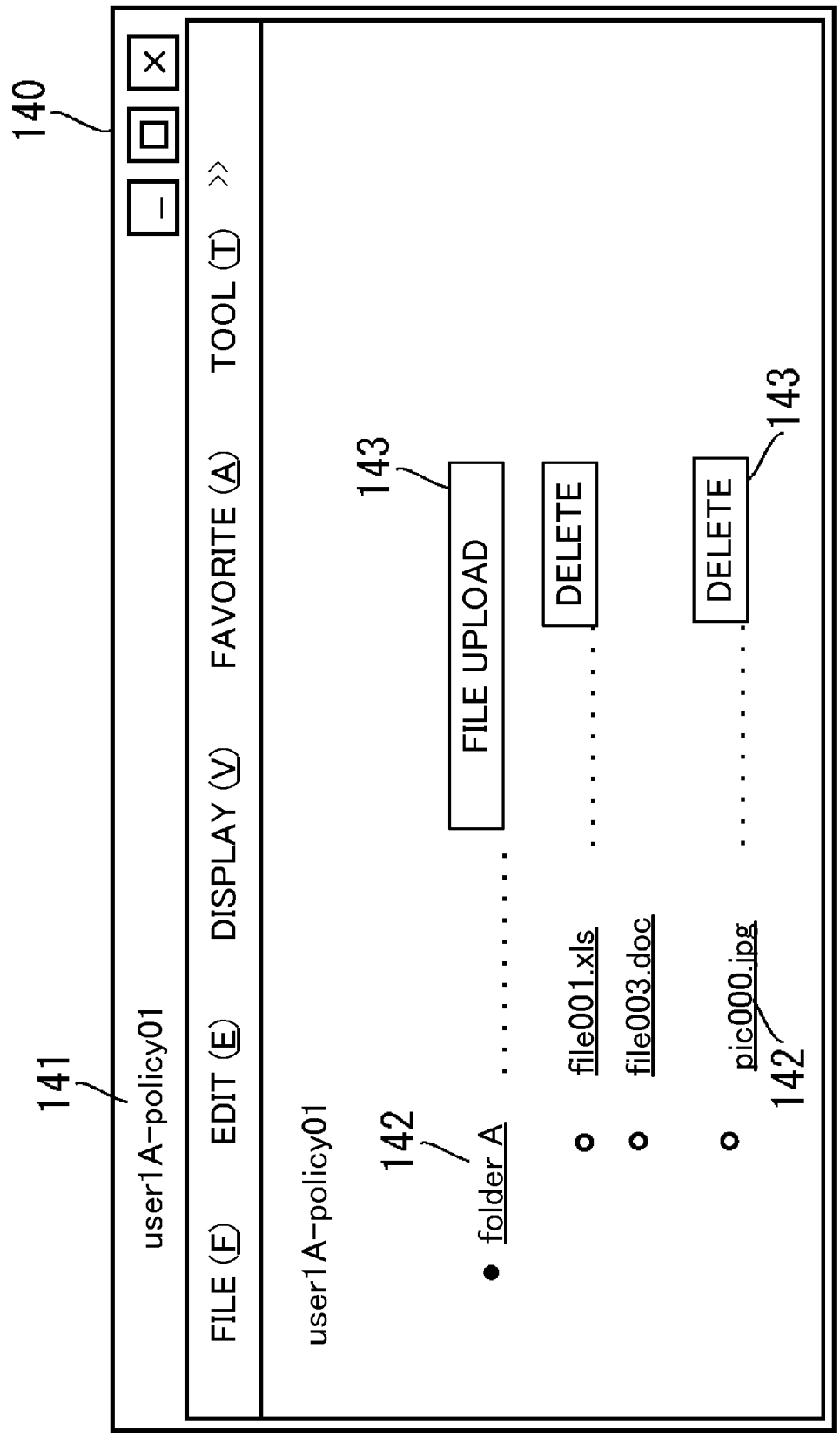

RELAY SERVER AND CLIENT TERMINAL

CROSS-REFERENCE TO RELATED APPLICATIONS

This application claims priority under 35 U.S.C. 119 to Japanese Patent Application No. 2006-341066, filed on Dec. 19, 2006, which application is hereby incorporated by reference in its entirety.

BACKGROUND OF THE INVENTION

1. Field of the Invention

The present invention relates to a relay communication system capable of communicating with a communication device in another local area network (LAN) over a wide area network (WAN). In particular, the present invention relates to a technique of operating, from the communication device in a certain LAN, resources held by a communication device in another LAN.

2. Description of the Related Art

A communication technique referred to as VPN (Virtual Private Network) has been proposed. Through the use of such communication technique, another LAN at a remote location can be used as if it is a directly connected network. For instance, the terminals connected to the LAN of a plurality of branch offices established in every region can communicate over the Internet.

However, this type of system tends to be a rigid system in terms of virtually building the network. Thus, it is not easy to build a system having expandability and flexibility, and systems that have been proposed up to now have advantages and disadvantages in function, cost, and the like.

If resources are provided in the same LAN, those resources can be easily shared, etc., among a plurality of terminals since resources are normally managed by the same protocol, and the system configuration is not all that complex. However, if the communication system extends over a plurality of LANs over the WAN, when desiring to share resources such as folders and files among a plurality of terminals or to delete files held by a certain terminal from another terminal, such desire cannot be easily satisfied. This is even more of a problem when the protocols used in the respective LAN differ.

Although the resources held by each terminal constantly change by deletion, movement, and the like, it is not easy to dynamically respond to such changes. Moreover, a mechanism for providing such dynamically changing information to users in a format of higher versatility does not exist.

SUMMARY OF THE INVENTION

In order to overcome the problems described above, preferred embodiments of the present invention provide an easily operable relay communication system that allows each communication device to share resources or to operate resources with the necessary party as necessary even between communication devices connected to different LANs and managed by different protocols. In addition, preferred embodiments of the present invention provide a technique for providing information held by the relay communication system to the user in a format of high versatility.

Preferred embodiments of the present invention provide a relay server connected to a LAN and communicable with a relay server of another LAN. The server includes an account information registering unit for storing account information including information of a client terminal connected to the same LAN; and a relay group information registering unit for storing relay group information including information of a group of relay servers permitting connection with one another. The server further includes a shared resource information registering unit for storing shared resource information including information of a resource and information of the client terminals sharing the resource; and a relay processing unit for, when accepting from the client terminal stored in the account information registering unit operation instruction on a resource operable by a client terminal connected to another LAN based on the shared resource information, relaying the operation of the resource based on the relay group information. The server further includes a resource information providing unit for, when accepting an access based on a predetermined protocol from an external client terminal, converting the shared resource information to a format of the predetermined protocol and providing the information to the external client terminal, the external client terminal other than the client terminal stored in the account information registering unit being registerable in the shared resource information registering unit.

In the relay server, information concerning whether or not to permit the access based on the predetermined protocol is set in each resource registered in the shared resource information; and the resource information providing unit extracts information related to the resource to which access based on the predetermined protocol is permitted of the resources contained in the shared resource information and provides the information to the external client terminal.

Furthermore, in the relay server, information related to an operation permitted with respect to the external client terminal is set in each resource registered in the shared resource information, and the resource information providing unit embeds a command module related to the permitted operation in the information related in the resource to which the access based on the predetermined protocol is permitted and provides the information to the external client terminal.

Moreover, in the relay server, the external client terminal can be registered in the shared resource information registering unit.

In the relay server, setting can be performed as to whether or not to permit the access based on the predetermined protocol for each resource registered in the shared resource information registering unit.

Preferred embodiments of the present invention also provide a client terminal stored in the account information registering unit by the relay server, wherein the external client terminal can be registered in the shared resource information managed by the shared resource information registering unit.

The client terminal according to a preferred embodiment of the present invention is a client terminal stored in the account information registering unit by the relay server, wherein whether or not to permit the access based on the predetermined protocol is set for each resource managed by the shared resource information.

The communication device thus can operate the resource held by another communication device over the WAN by using the relay server according to a preferred embodiment of the present invention. The HTTP client terminal connected to the LAN and the WAN can reference the shared resource information held by the relay communication system through HTTP access. Since the shared resource information is provided in a format having high versatility, the user can access the shared resource using various terminals such as portable telephone and PDA (Personal Digital Assistant).

Other features, elements, processes, steps, characteristics and advantages of the present invention will become more

BRIEF DESCRIPTION OF THE DRAWINGS

FIG. 5 is a view showing content of relay group information according to a preferred embodiment of the present invention.

FIG. 6 is a view showing content of shared resource information according to a preferred embodiment of the present invention.

FIG. 8 is a view showing a flow of process of the resource operation according to a preferred embodiment of the present invention.

FIG. 9 is a view showing content of the shared resource information after addition of HTTP account according to a preferred embodiment of the present invention.

FIG. 10 is a view showing content of an HTML file output from the shared resource information after addition of the HTTP account according to a preferred embodiment of the present invention.

FIG. 11 is a view showing a WEB screen displayed on a monitor of an HTTP client according to a preferred embodiment of the present invention.

FIG. 12 is a view showing content of the shared resource information after the resource operation according to a preferred embodiment of the present invention.

FIG. 13 is a view showing content of the HTML file output from the shared resource information after the resource operation according to a preferred embodiment of the present invention.

FIG. 14 is a view showing the WEB screen displayed on the monitor of the HTTP client according to a preferred embodiment of the present invention.

DETAILED DESCRIPTION OF PREFERRED EMBODIMENTS

Figure 1:
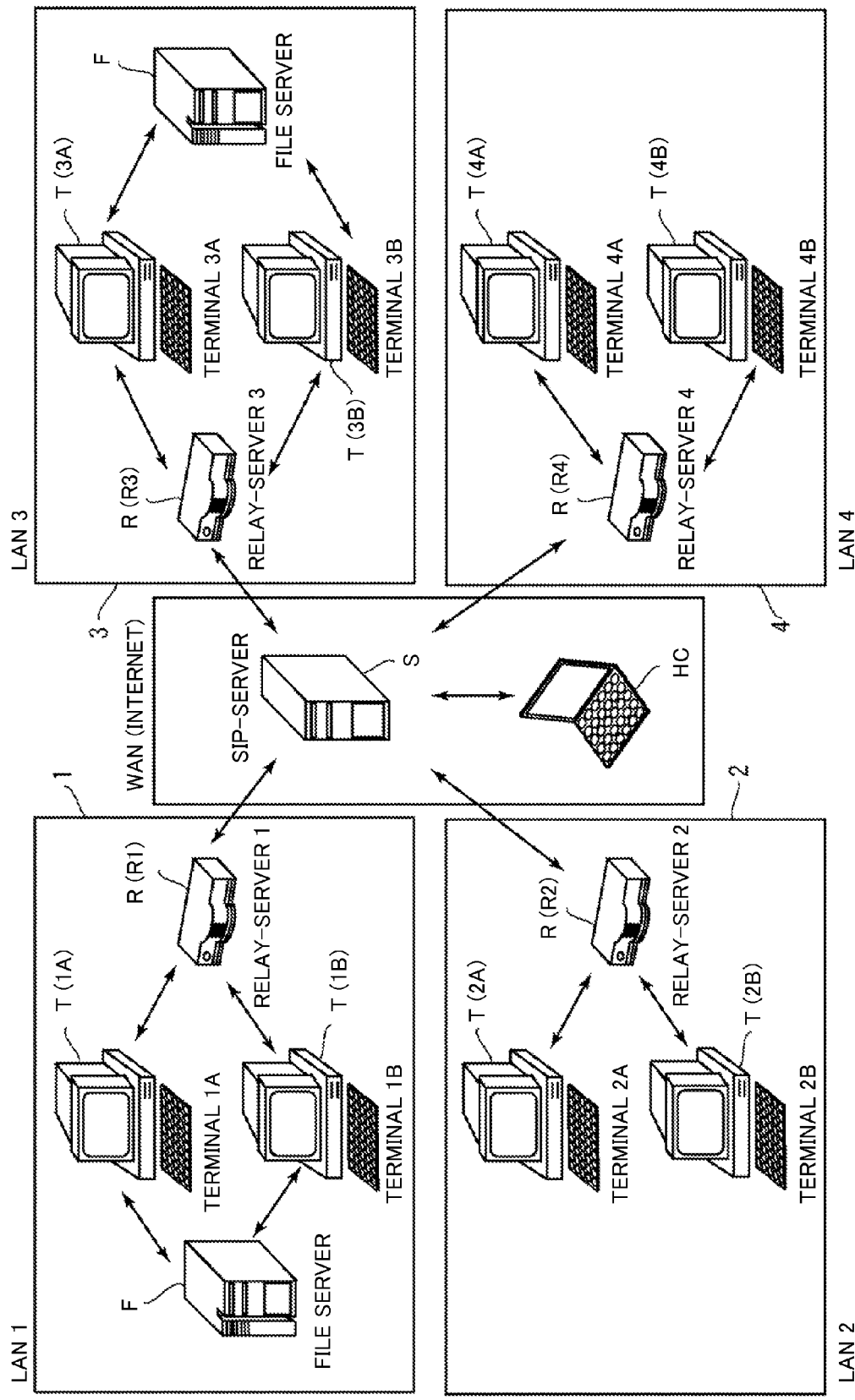
FIG. 1 is a network configuration view of a relay communication system according to a preferred embodiment of the present invention.

Preferred embodiments of the present invention will now be described with reference to the drawings. FIG. 1 shows an overall configuration of a relay communication system according to a preferred embodiment of the present invention. As shown in FIG. 1, the present relay communication system is configured by a plurality of LANs connected to the WAN. The present relay communication system includes an external server S, a relay server R, a communication device T, a file server F, an HTTP client terminal HC, and the like. A preferred embodiment including the external server S is shown herein, but direct communication may be established between the relay servers R without using the external server S. An SIP (Session Initiation Protocol) is suitably used for the communication protocol, and is used in the preset preferred embodiment for explanation.

The WAN (Wide Area Network) is a network for connecting different LANs. In the present preferred embodiment, the Internet is shown as the WAN, but is not limited thereto, and other similar networks may be applied.

The LAN (Local Area Network) is a relatively small-scale network built in a limited location. The LAN exists in plurals, each of which being built at a physically remote location. In the present preferred embodiment, the LAN 1 is built at the Tokyo branch office A, and LANs 2, 3, 4 are respectively built at each branch office B, C, D in Osaka, Nagoya, and Fukuoka. The four LANs 1, 2, 3, and 4 are respectively connected to the Internet, which is a global network. It should be noted that the number of LANs merely needs to be two or more, and is not limited to four.

The external server S is equipment used for the communication between relay servers R arranged in each LAN, and is installed on the Internet. The external server S has a function of serving as a SIP server. Specifically, the external server S has a function of serving as a SIP proxy server for relaying SIP methods and responses, and an SIP registrar server for registering the account of the relay server R. The external server S is not limited to one, and a plurality of external servers may function in a dispersed manner. When using protocols other than the SIP, the communication between the relay servers R merely needs to be controlled based on the relevant protocol, and the external server S functioning as the SIP server does not necessarily need to be arranged.

Figure 2:
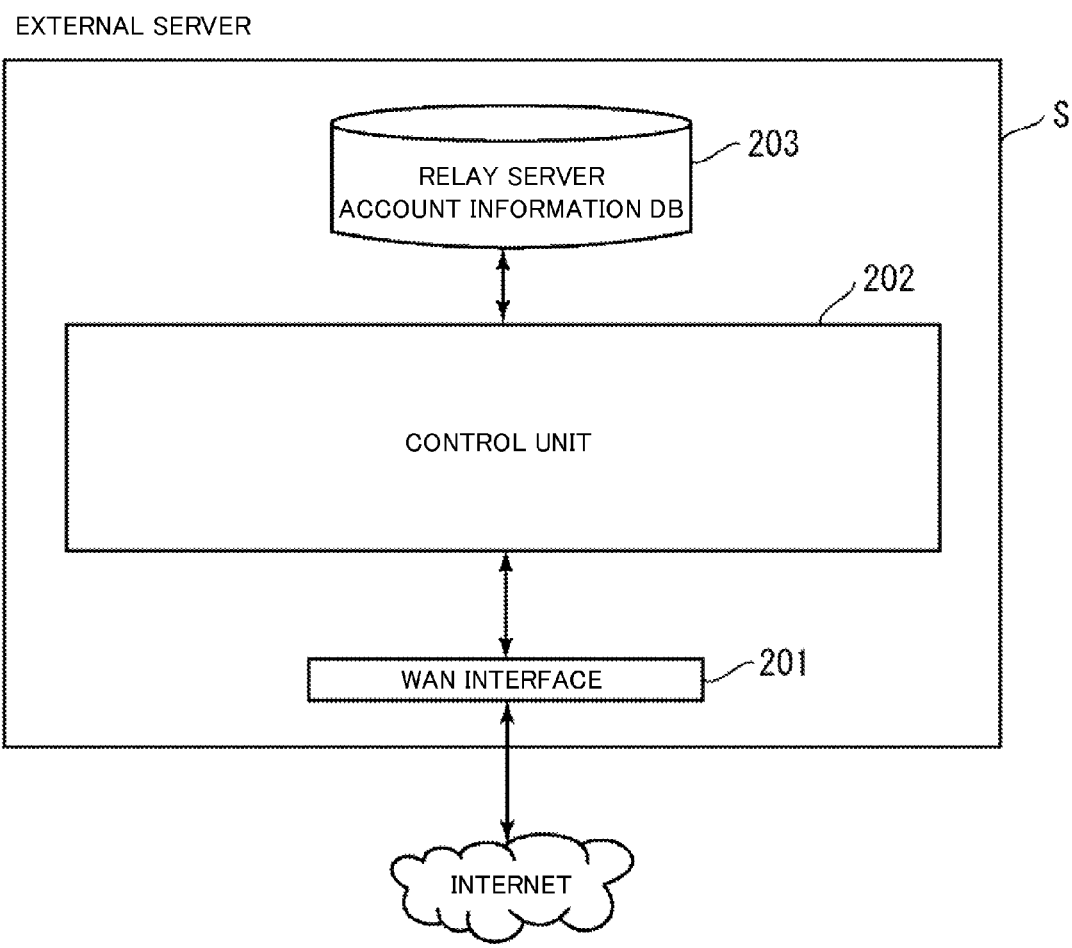
FIG. 2 is a functional block diagram of an external server according to a preferred embodiment of the present invention.

FIG. 2 shows a functional block diagram of the external server S. As shown in FIG. 2, the external server S includes a WAN interface 201, a control unit 202, a relay server account information database (DB) 203, and the like.

The WAN interface 201 is an interface for performing communication with each device such as relay server R connected to the Internet using a global IP address. The relay server account information DB 203 is a database for managing the account of the relay server R that has made a registration request in correspondence to the global IP address. The control unit 202 is a processing unit for controlling various communications performed through the WAN interface 201, and controls communication processes complying with protocols such as TCP/IP, UDP and SIP. For instance, the control unit 202 executes processes such as a process of receiving the account of each relay server R transmitted from each relay server R and registering the same in the relay server account information DB 203, and a process of relaying communication data such as various SIP methods and responses transmitted from the relay server R to another relay server R.

The communication device T is a client terminal (hereinafter simply referred to as client terminal T) which the user can directly operate. The client terminal T includes personal computer (PC), and the like used by the user on a daily routine. A great number of client terminals T normally exist in the LAN, but in the present preferred embodiment, a case where the client terminals 1A, 1B are connected to the LAN 1, the client terminals 2A, 2B are connected to the LAN 2, the client terminals 3A, 3B are connected to the LAN 3, and the client terminals 4A, 4B are connected to the LAN 4 is shown. A private IP address uniquely managed only in the same LAN is given to each client terminal T.

Figure 3:
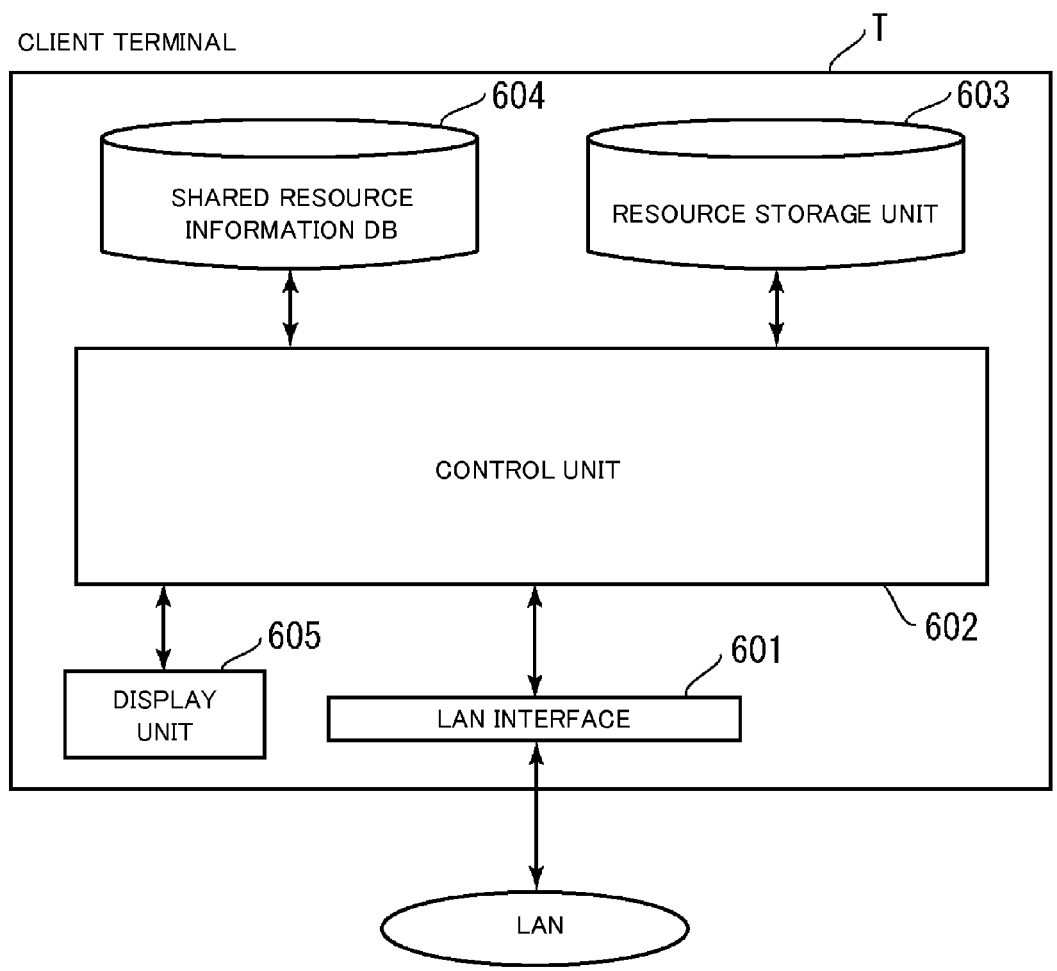
FIG. 3 is a functional block diagram of a communication device according to a preferred embodiment of the present invention.

FIG. 3 shows a functional block diagram of the client terminal T. As shown in FIG. 3, the client terminal T includes a LAN interface 601, a control unit 602, a resource storage unit 603, a shared resource information database (DB) 604, a display unit 605, and the like.

The LAN interface 601 is an interface for performing communication with each device such as relay server R and file server F connected to the same LAN using the private IP address. The resource storage unit 603 stores entities of resources such as files and folders operable by the client terminal T. The shared resource information database (DB) 604 stores shared resource information 120 described with information of shared resources held by each client terminal T including information on resources held by the client terminal T and information on the account of the client terminal T sharing the relevant resource. The display unit 605 visually displays content of the relay group information 100 and the shared resource information 120. The control unit 602 is a processing unit for controlling various communications performed through the LAN interface 601. The control unit 602 controls communication processes complying with protocols such as TCP/IP, UDP, and SIP.

For instance, the control unit 602 executes a process of controlling movement, change, deletion, etc. of resources stored in the resource storage unit 603, a process of receiving the shared resource information 120 from the relay server R, a process of displaying the content of the shared resource information 120 in cooperation with the display unit 605, a process of accepting operation instruction of the resource and judging whether or not the relevant resource is directly operable, a process of registering the shared resource information 120 in the relay server R, and the like.

One relay server R is arranged in each LAN. The relay server R1 is arranged in the LAN 1, the relay server R2 is arranged in the LAN 2, the relay server R3 is arranged in the LAN 3, and the relay server R4 is arranged in the LAN 4.

The relay server R is also connected to the Internet in addition to the LAN, and is communicable with each client terminal T connected to the same LAN and also communicable with the relay server R connected to another LAN through the external server S. Thus, a global IP address is given to each relay server R in addition to the private IP address.

Figure 4:
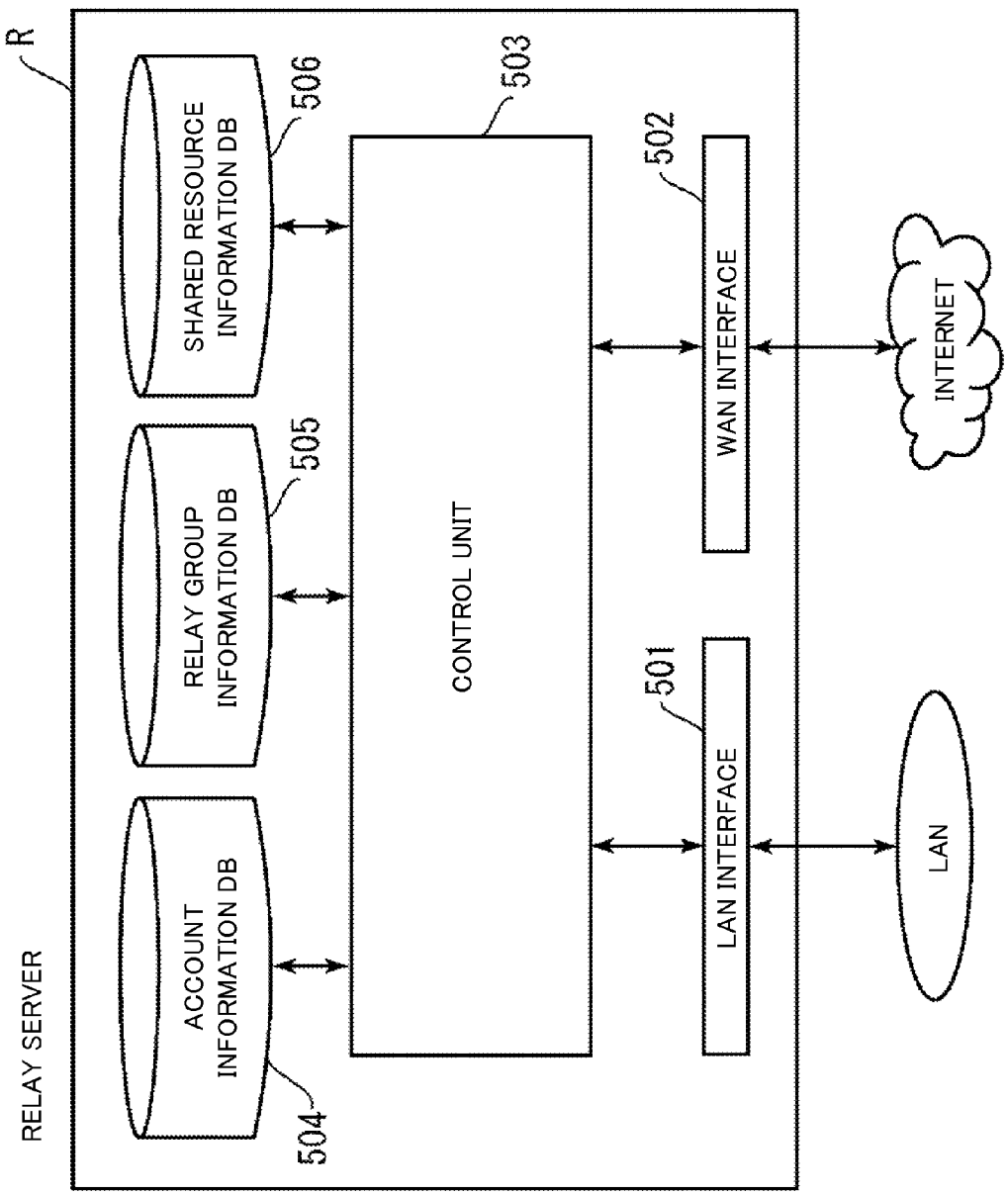
FIG. 4 is a functional block diagram of a relay server according to a preferred embodiment of the present invention.

FIG. 4 shows a functional block diagram of each relay server R. As shown in FIG. 4, the relay server R includes a LAN interface 501, a WAN interface 502, a control unit 503, an account information database (DB) 504, a relay group information database (DB) 505, a shared resource information database (DB) 506, and the like.

The LAN interface 501 is an interface for performing communication with the client terminal T, etc. connected to the LAN using the private IP address. For instance, the relay server R1 performs communication with each client terminal 1A, 1B using the LAN interface 501 in the LAN 1. The WAN interface 502 is an interface for performing communication with each device such as external server S connected to the Internet using the global IP address. In the present preferred embodiment, the relay server R has a configuration including the WAN interface 502, but a mode in which the connection with the Internet is performed by a router and the relay server R is arranged thereunder may be adopted.

The account information DB 504 is a database for managing the account of the client terminal T that has made a registration request in correspondence to the private IP address. The relay group information DB 505 is a database for managing the relay group information 100 to which the client terminal T registered in the account information DB pertains. The shared resource information DB 506 is a database for managing the shared resource information 120 to which the client terminal T registered in the account information DB pertains.

The control unit 503 is a processing unit for controlling various communications performed via the LAN interface 501 and the WAN interface 502, and controls various communication processes complying with protocols such as TCP/IP, UDP, and SIP. For instance, the control unit 503 executes a process of transmitting the account of its device to the external server S to request for registration, a process of registering the account transmitted from the client terminal T connected to the same LAN in the account information DB 504, a process of creating the relay group information 100 and storing the same in the relay group information DB 505, a process of creating the shared resource information 120 and storing the same in the shared resource information DB 506, and the like.

The relay group information 100 and the shared resource information 120, which are information handled in the present relay communication system, will now be described.

The relay group information 100 recording information of the relay servers R permitting connection with one another is stored in the relay group information DB 505 of each relay server.

The relay group information 100 is normally set in an initial stage of the relay communication system. The relay group information 100 is subjected to change notification setting such that the content is automatically updated when any of the relay group information is changed, thereby enabling dynamic response even if the account of the relay server R or the client terminal T varies.

One example of the relay group information 100 is shown in FIG. 5. FIG. 5 shows the relay group information 100 created by exchanging information among three relay servers R1, R2, R3 with the relay server R1 as the base point, and stored in the respective relay group information DB 505. The relay group information 100 is configured by one group identifying information 101, and information (relay account information) 102 on three relay servers R1, R2, R3 permitting connection with one another. In FIG. 1, the LAN 4 (relay server R4) cannot join the communication service described herein as it does not perform registration of account, and thus is not connected to the network.

The group identifying information 101 is information for identifying the relay group information 100, and is given different ID so as to be uniquely identified every time the relay group information is created. Therefore, the operator and the like can specify the relay group with the group identifying information 101 and easily change, etc. the group configuration.

The relay account information 102 is configured by information such as account of the relay server R, account of the client terminal T connected to the same LAN as the relevant relay server R and registered in the relay server R, and the like. The account of the relay server R is respectively given a specific name so as to be easily identified by the user. Similarly, the account of each client terminal T is also given a specific name. For instance, in the case of the relay account information 102 of the relay server R1 (Relay-server 1), the name (branch office A) 104 is given to the account (Relay-server1@net) of the relay server R1. The account (e.g., user1A@account) of the client terminal T connected to the relay server R1 and the name thereof (e.g., user1A) 105 are stored (in lower level) in association with the account information of the relay server R1. Reference numeral 103 indicates identification data indicating the sector to which the client terminal T belongs such as "marketing department" and "development department".

As described above, the relay group information 100 is created to be uniquely identifiable for every relay group information, and includes a group of relay account information 102 permitting connection with one another. The relay account information 102 includes the account of each relay server R and the account of the client terminal T arranged in the same LAN as the relevant relay sever and registered therein, and thus which LAN and which LAN are grouped and which relay server R or client terminal T is registered in the respective LAN become apparent with reference to the relay group information 100.

The shared resource information 120 is information including information of a plurality of client terminals T sharing resources such as files and folders with one another, and information of the resources to be shared, and is information stored in the shared resource information DB 506 of the relay server or the shared resource information DB 604 of the client terminal T.

One example of the shared resource information 120 is shown in FIG. 6. FIG. 6 shows the shared resource information 120 stored in the shared resource information DB 604 of the client terminal 1A. The shared resource information 120 is configured by account identifying information 121 indicating to be the shared resource information 120 related to the client terminal 1A, and individual shared resource information 122 to which the client terminal 1A pertains. The individual shared resource information 122 is configured by shared resource identifying information 123, family account information 124, family resource information 125, and the like. In this example, one resource sharing group to which the client terminal 1A pertains is formed, and thus the shared resource information 120 has a configuration including one individual shared resource information 122. If the resource sharing group to which the client terminal 1A pertains is formed in plurals, the shared resource information 120 accordingly contains a plurality of individual shared resource information 122. The resource sharing group is formed by client terminals 1A, 2A, and 3A in the example of FIG. 6, but if another resource sharing group is formed by client terminals 1A, 2B, and 3B, the individual shared resource information 122 corresponding thereto will be generated.

The shared resource identifying information 123 is information for identifying the individual shared resource information 122, and is given different ID so as to be uniquely identifiable every time the individual shared resource information is created. Therefore, the user and the like can specify the individual shared resource information 122 with the shared resource identifying information 123 and easily edit, etc., the content thereof.

The family resource information 125 is an aggregate of resource information 126 indicating entities of resources such as files and folders held by the client terminal T. Each resource information 126 is configured by information (e.g., resource name="folderA") of the name of the entity of the resource to be shared, information (e.g., owner="user1A@account") of the account of the client terminal T (owner client terminal) capable of operating the entity of the relevant resource, and information (e.g., value="c:/folderA") of the address indicating the whereabouts of the entity of the resource.

The family account information 124 is an aggregate of the account (e.g., user1A@account) of the client terminal T sharing the entity of the resource shown in the family resource information 125. The family account information 124 is configured by the owner client terminal T, and the client terminal (user client terminal) capable of operating the entity of the resource indirectly through the owner client terminal T. The user client terminal T is a client terminal T that cannot directly operate the entity of the resource, but can indirectly operate the resource through the owner client terminal T.

The client terminal T sharing the resource can be specified with reference to the shared resource information 120 configured as above, whereby the type and whereabouts of the relevant resource can be known.

The shared resource information 120 is register processed by the client terminal T. That is, the client terminal T has a function of registering information (resource information) 126 of the resource directly or indirectly operable by the relevant client terminal T, and information of the account of another client terminal T sharing the relevant resource in the relay server R. Therefore, the operator can easily create and change the shared resource information 120 through the display unit 605 of the client terminal T.

The relay communication system of the present preferred embodiment described above is HTTP accessible through the LAN or the WAN. In the present preferred embodiment, a case in which the HTTP client terminal HC (hereinafter abbreviated as terminal HC) connected to the WAN makes an HTTP access to the relay communication system, as shown in FIG. 1, will be described. The terminal HC may be a PDA (Personal Digital Assistance) or a portable telephone.

Figure 7:
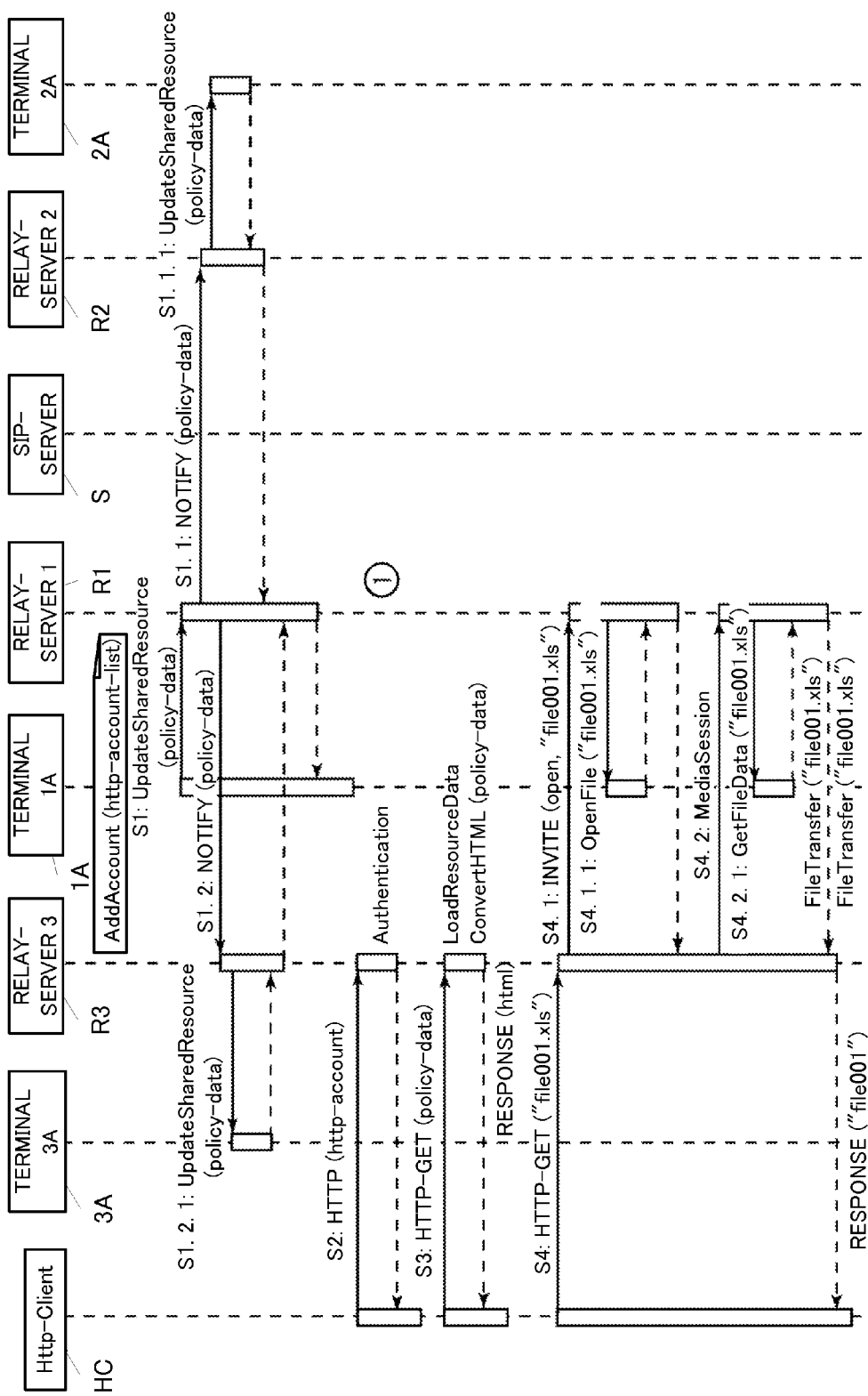
FIG. 7 is a view showing a flow of process of the resource operation according to a preferred embodiment of the present invention.

FIGS. 7 and 8 are sequence charts showing a process of joining the terminal HC to the relay communication system, and a process of actually performing the resource operation. First, an operation (AddAccount) of adding an account of the terminal HC is performed in the client terminal 1A. The client terminal 1A transmits the account information, the authentication information and the like of the terminal HC to the relay server R1. The relay server R1 registers the account information and the authentication information of the terminal HC to a predetermined storage unit, and transfers the account information and the authentication information of the terminal HC to the relay servers R2, R3 to which the shared resource information 120 pertains.

The client terminal 1A updates the shared resource information 120. The shared resource information 120 after update is shown in FIG. 9. As shown in the figure, the account (http-account1) of the terminal HC is added to the family account information 124.

The client terminal 1A additionally describes information for HTTP access to the family resource information 125 through a process of adding the account of the terminal HC to the family account information 124. Specifically, as shown in FIG. 9, access decision information 127 indicating whether or not to permit HTTP access is set for every resource. The content of the operation permitted for the terminal making HTTP access is set for every resource as permitted operation information 128.

Among the shared resources, http="enable" is set as the access decision information 127 in the resource permitting HTTP access, and http="disable" is set for the resource rejecting HTTP access. In the illustrated example, the shared resources other than "file002.wrd" are set to permit HTTP access.

If the permitted operation is a read-out operation, http-act="r" is set as the permitted operation information 128. If the write operation is permitted, http-act="w" is set, and if the delete operation is permitted, http-act="d" is set. In the figure, http-act="rw" is set for the folder A, and thus read-out of the file in the folder A is permitted and write of the file to the folder A is permitted.

The access decision information 127 and the permitted operation information 128 can be individually set for every resource when the HTTP client is added. Alternatively, a default value may be defined, and unless particularly specified, the default setting may be used. Furthermore, in the present preferred embodiment, processes such as registration of the HTTP client terminal to the shared resource information 120 and registration of access decision information 127 and permitted operation information 128 are performed in the client terminal T, but such processes may be performed in the relay server R through operation of the operator.

The sequence of FIG. 7 will again be referenced. The client terminal 1A makes an update request (UpdateSharedResource) of the shared resource information 120 to the relay server R1 (step S1). In response, the relay server R1 makes a change notification (NOTIFY) of the shared resource information 120 to the relay servers R2, R3 (step S1.1, step S1.2). The relay servers R2, R3 respectively transmit the update request of the shared resource information 120 to the client terminals 2A, 3A (step S1.1.1, step S1.2.1). The updated content of the shared resource information 120 is notified to the client terminals 2A, 3A listed in the family account information 124 of the shared resource information 120 in such manner.

Subsequently, the terminal HC transmits the account via the WAN, and makes an HTTP access on the relay server R3 (step S2). The relay server R3 responds to the terminal HC after performing the authentication process (Authentication). The terminal HC then makes an acquisition request (HTTP-GET) for the shared resource information 120 to the relay server R3 (step S3).

When receiving such acquisition request from the terminal HC, the relay server R3 loads the shared resource information (LoadResourceData), and HTML converts the loaded shared resource information 120 (ConvertHTML). The relay server R3 then transmits the converted HTML file 130 to the terminal HC as a response.

FIG. 10 shows the content of the HTML file 130 transmitted from the relay server R3 to the terminal HC. A WEB browser is activated in the terminal HC, and a WEB screen 140 generated based on the received HTML file 130 is displayed on a monitor. FIG. 11 shows the WEB screen 140 displayed on the monitor of the terminal HC. The HTML converted shared resource information 120 is thus displayed on the monitor of the terminal HC in such manner.

The content of the HTML file 130 shown in FIG. 10 is basically provided to visually display the shared resource information 120 on the WEB browser. The title information 131 is a description that shows the title 141 displayed on a window bar of the WEB screen 140 shown in FIG. 11.

The link information 132 includes name of the resource and the link information. The name of the resource is displayed as resource name 142 in the WEB screen 140 shown in FIG. 11. Access path to the entity of the resource is linked to the resource name 142 by the link information 132. When an operation of selecting the resource name 142 is performed on the WEB screen 140, a process of accessing the entity of the relevant resource is performed. The resource in which "enable" is set for the access decision information 127 is listed as the resource information 132. That is, among the resources contained in the shared resource information 120, only the shared resource permitting HTTP access is extracted and included in the HTML file 130. Only such extracted shared resource is displayed on the WEB screen 140 shown in FIG. 11.

The operation command on the resource is described in a command embedding part 133 following the <INPUT> tag. That is, the command module of the resource operation is embedded. The operation button 143 is displayed on the WEB screen 140 shown in FIG. 11 by the description of the command embedding part 133. When the operation of selecting the operation button 143 is performed on the WEB screen 140, the process described in the command embedding part 133 is executed in response thereto.

The user of the terminal HC performs the operation of selecting the resource name 142 ("file001.xls") while the WEB screen 140 is displayed on the monitor of the terminal HC. In response to such operation, the terminal HC makes an acquisition request (HTTP-GET) for the "file001.xls" to the relay server R3 (step S4). The relay server r3 specifies that the owner client terminal of the "file001.xls" is the client terminal 1A based on the shared resource information 120, and also specifies relaying the same to the relay server R1 based on the relay group information 100.

The relay server R3 transmits an INVITE method to the relay server R1 via the SIP server S, and makes a file-open request of the "file001.xls" (step S4.1). The relay server R1, which has received such request, transmits the file-open request to the client terminal 1A (step S4.1.1). The client terminal 1A returns an OK response to the relay server R1 if the "file001.xls" is operable. The relay server R1 then returns an OK response to the relay server R3.

The relay server R3, which has received the OK response, makes a file-acquisition request using Mediasession established between the relay server R1 and the relay server R3 (step S4.2). The relay server R1 then makes a file-acquisition request to the client terminal 1A (step S4.2.1). In response thereto, the client terminal 1A transmits the "file001.xls" to the relay server R3 via the relay server R1 (FileTransfer). The relay server R3 then transmits the "file001.xls" to the terminal HC as a response. The terminal HC is then able to reference the "file001.xls".

The sequence of FIG. 8 will now be referenced. The user of the terminal HC then performs a process of uploading "pic000.jpg". The user of the terminal HC selects the operation button 143 displayed on the right of the "folderA" displayed on the WEB screen 140 shown in FIG. 11. That is, the user selects the operation button 143 displayed as "FILE UPLOAD". In a predetermined screen displayed following such operation, an operation of specifying "pic000.jpg" in the disc of the terminal HC is performed.

In response to such operation, the terminal HC makes an update request (HTPP-PUT) of the "pic000.jpg" to the relay server R3 (step S5). The relay server R3 specifies that the owner client terminal of the "folderA" is the client terminal 1A based on the shared resource information 120, and also specifies relaying the same to the relay server R1 based on the relay group information 100.

The relay server R3 transmits an INVITE method to the relay server R1, and makes an update request of adding the "pic000.jpg" to the "folderA" (step S5.1). The relay server R1, which has received such request, transmits the update request to the client terminal 1A (step S5.1.1). The client terminal 1A returns an OK response to the relay server R1 if the "folderA" is operable. The relay server R1 then returns an OK response to the relay server R3.

The relay server R3, which has received the OK response, transmits the update request of the "pic000.jpg" using Mediasession established between the relay server R1 and the relay server R3 (step S5.2). The relay server R1 then makes a file-update request to the client terminal 1A (step S5.2.1). Accordingly, the client terminal 1A writes the "pic000.jpg" to the "folderA". After the write process is terminated, the client terminal 1A transmits the OK response to the relay server R3 via the relay server R1. The relay server R3 then transmits a BYE method to the relay server R1 (step S5.3). The Mediasession between the relay servers is then disconnected. The OK response is returned to the terminal HC.

After the updating process of the file "pic000.jpg" is terminated, the relay server R3 updates the shared resource information 120. FIG. 12 shows the shared resource information after update. Apparently, the "pic000.jpg" is added as the shared resource. The client terminal 1A, which is the owner of "folderA", is designated as the owner client terminal. Furthermore, "enable" is set for the access decision information 127, and "r/d" is set for the permitted operation information 128 with respect to the added "pic000.jpg". Such settings may be carried out based on default setting or may be specified by the user of the terminal HC.

After the shared resource information 120 is updated, the relay server R3 makes a change notification (NOTIFY) of the shared resource information 120 to the relay servers R1, R2 (step S6, step 8). The relay server R3 makes an update request (UpdateSharedResource) of the shared resource information 120 to the client terminal 3A (step S7). The relay servers R1, R2 make the update request of the shared resource information 120 to the client terminals 1A, 2A (step S6.1, step S8.1). The shared resource information 120 is thereby updated in the client terminals 1A, 2A, 3A listed in the family account information 124.

The HTML file 130 generated based on the shared resource information 120 after update is shown in FIG. 13. Apparently, the "pic000.jpg" has been added as the link information 132a. Regarding the resource "pic000.jpg", the command embedding part 133a specifying delete command is described based on the shared resource information 120 after update.

FIG. 14 is a view showing the WEB screen 140 generated based on the HTML file 130 shown in FIG. 13. Apparently, the "pic000.jpg" is added as the resource information. The "DELETE" button is displayed on the right of the resource information of "pic000.jpg". Thus, the terminal HC or another HTTP client terminal registered in the family account information 124 can reference the file "pic000.jpg" added by the terminal HC or can perform deleting operation.

Therefore, the client terminal T connected to the LAN can operate the shared resource existing in another LAN by using the relay communication system of the present preferred embodiment. Since the information of the shared resources is dynamically reflected on the entire system, a convenient system is achieved. Furthermore, according to the present preferred embodiment, the HTTP client terminal HC can reference the shared resource information 120 via the LAN and the WAN. When providing the shared resource information 120 to the HTTP client terminal HC, such information is HTML converted. Therefore, the HTTP client terminal HC can access the information of the most recent shared resource by using a general WEB browser.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

What is claimed is:

1. A relay server connected to a first LAN and communicable with another relay server connected to a second LAN, the relay server comprising:
    an account information registering unit arranged to store account information about a client terminal connected to the first LAN;
    a relay group information registering unit arranged to store relay group information including account information about the relay server and the another relay server and account information about client terminals connected to the relay server and the another relay server via the first and second LANs, respectively;
    a shared resource information registering unit arranged to store shared resource information including:
        a name of a file or a folder defining a resource;
        information about an owner client terminal which is a client terminal capable of operating the resource;
        information about resource sharing client terminals that share the resource;
        information regarding whether or not the resource can be shared by an external client terminal that is not stored in the relay group information registering unit;
        information about the external client terminal; and
        information about a protocol connected to the external client terminal;
    a first relay processing unit arranged to, when accepting an operation instruction of a resource from the resource sharing client terminals, specify the owner client terminal based on the shared resource information, specify a relay server connected to the specified owner client terminal based on the relay group information, and relay the operation instruction of the resource to the specified relay server;
    a converted resource information providing unit arranged to, when accepting an access based on the protocol from the external client terminal, extract a resource that can be shared by the external client terminal from the shared resource information, convert information of the extracted resource to a format of the protocol, and provide the converted resource information to the external client terminal; and
    a second relay processing unit arranged to, when accepting from the external client terminal an operation instruction of a resource based on the converted resource information, specify the resource that has the accepted operation instruction from the shared resource information, specify an owner client terminal of the specified resource, specify a relay server connected to the specified owner client terminal based on the relay group information, and relay the operation instruction of the specified resource to the specified relay server.

2. The relay server according to claim 1, wherein information related to an operation that is permitted for the external client terminal is set in each resource registered in the shared resource information, and the converted resource information providing unit embeds a command module related to the permitted operation in the information for each of the resources to which the access based on the protocol is accepted and provides the information to the external client terminal.

3. The relay server according to claim 1, wherein setting can be performed as to whether or not to permit the access based on the predetermined protocol for each resource registered in the shared resource information registering unit.

4. A client terminal stored in the account information registering unit by the relay server according to claim 1, wherein the external client terminal is registerable in the shared resource information managed by the shared resource information registering unit.

5. A client terminal stored in the account information registering unit by the relay server according to claim 2, wherein the external client terminal is registerable in the shared resource information managed by the shared resource information registering unit.

6. A client terminal stored in the account information registering unit by the relay server according to claim 3, wherein the external client terminal is registerable in the shared resource information managed by the shared resource information registering unit.

7. A client terminal stored in the account information registering unit by the relay server according to claim 1, wherein whether or not to accept the access based on the protocol is set for each resource managed by the shared resource information unit.

8. A method of controlling a relay server connected to a first LAN and communicable with another relay server connected to a second LAN, the method comprising the steps of:

storing account information about a client terminal connected to the first LAN;

storing relay group information including account information about the relay server and the another relay server and account information of client terminals connected to the relay server and the another relay server via the first and second LANs;

storing, in a memory, shared resource information including:

a name of a file or a folder defining a resource;

information about an owner client terminal which is a client terminal capable of operating the resource;

information about resource sharing client terminals that share the resource:

information regarding whether or not the resource can be shared by an external client terminal that is not stored in the relay group information registering unit;

information about the external client terminal; and information about a protocol connected to the external client terminal;

when accepting an operation instruction of a resource from the resource sharing client terminals, specifying the owner client terminal based on the shared resource information, specifying a relay server connected to the specified owner client terminal based on the relay group information, and relaying the operation instruction of the resource to the specified relay server;

when accepting an access based on the protocol from the external client terminal, extracting a resource capable of being shared by the external client terminal from the shared resource information, converting information of the extracted resource to a format of the protocol and providing the converted resource information to the external client terminal; and when accepting from the external client terminal an operation instruction of a resource based on the converted resource information, specifying the resource that has the accepted operation instruction from the shared resource information, specifying an owner client terminal of the specified resource, specifying a relay server connected to the specified owner client terminal based on the relay group information, and relaying the operation instruction of the specified resource to the specified relay server.

9. The method of controlling the relay server according to claim 8, wherein information related to an operation that is permitted for the external client terminal is set in each resource registered in the shared resource information; and the method further comprises the step of:

embedding a command module related to the permitted operation in the information related to the resource to which the access based on the protocol is permitted and providing the information to the external client terminal.

10. The method of controlling the relay server according to claim 8, further including a step of setting whether or not to permit the access based on the protocol for each resource registered in the memory by the relay server.

* * * * *